US 8,591,745 B2

(12) United States Patent
Merino et al.

(10) Patent No.: US 8,591,745 B2
(45) Date of Patent: Nov. 26, 2013

(54) SYSTEM AND METHOD FOR FILTRATION OF LIQUIDS

(75) Inventors: Filipe Merino, Madrid (ES); Luis Penacho, Barcelona (ES); Miquel Iribarren, Barcelona (ES); Antonio Vicente, Madrid (ES); Angel Cabria, Madrid (ES); Juan Carlos Pineiro, Madrid (ES)

(73) Assignee: EMD Millipore Corporation, Billerica, MA (US)

( * ) Notice: Subject to any disclaimer, the term of this patent is extended or adjusted under 35 U.S.C. 154(b) by 501 days.

(21) Appl. No.: 12/589,499

(22) Filed: Oct. 23, 2009

(65) Prior Publication Data

US 2010/0163495 A1 Jul. 1, 2010

(30) Foreign Application Priority Data

Nov. 11, 2008 (EP) .................................... 08382063

(51) Int. Cl.
*B01D 35/00* (2006.01)

(52) U.S. Cl.
USPC ........... 210/741; 210/739; 210/777; 210/778; 210/805

(58) Field of Classification Search
USPC .......................... 210/778, 739, 741, 777, 805
See application file for complete search history.

(56) References Cited

U.S. PATENT DOCUMENTS 2,423,172 A 7/1947 Booth
(Continued)

FOREIGN PATENT DOCUMENTS

DE 3405179 A1 8/1985
EP 0064795 A1 11/1982
(Continued)

OTHER PUBLICATIONS

Extended European Search Report received for EP Patent Application No. 08382063.9, mailed on May 14, 2009, 7 pages.

*Primary Examiner* — Duane Smith
*Assistant Examiner* — Paul J Durand
(74) *Attorney, Agent, or Firm* — EMD Millipore Corporation

(57) ABSTRACT

The present invention relates to a system and a process of running the system that allows for the long term filtration of product without loss of filtration capability due to clogging or fouling. The system is a normal flow filtration system having one or more filter cartridges attached to an outlet of a housing in the system. The filter cartridge(s) are contained within a bowl and depend preferably vertically from the outlet. Liquid enters the bowl of the housing and contacts the outer surfaces of the one or more cartridges. Impurities are trapped on or in the surface of the filter and the filtered liquid flows through the filter and through the outlet. One or more parameters such as flow rate, transmembrane pressure drop and/or time are measured and when the desired parameter(s) are met, the filtration ceases. A backflushing occurs back through the filter cartridges so as to remove the trapped impurities on or in the filter surface. This backwashed material is directed to an outlet of the bowl that is connected to a drain. Additionally a port formed in the side of the housing adjacent an outer surface of the cartridge(s) can be used to provide a lateral washing of the filter surfaces. The system is then recirculated in a downstream manner to reestablish equilibrium and filtration is the restarted.

22 Claims, 8 Drawing Sheets

(56) References Cited

U.S. PATENT DOCUMENTS

| | | |
|---|---|---|
| 3,155,613 A | 11/1964 | Felix et al. |
| 4,704,210 A | 11/1987 | Boze et al. |
| 4,973,404 A | 11/1990 | Weber et al. |
| 5,236,601 A * | 8/1993 | Snell et al. .................... 210/741 |
| 5,441,633 A * | 8/1995 | Schewitz ...................... 210/193 |
| 5,772,867 A * | 6/1998 | Chiang et al. ................... 210/90 |
| 5,878,374 A * | 3/1999 | Buchanan et al. .............. 702/45 |
| 6,589,430 B1 * | 7/2003 | Pecar et al. .................... 210/741 |
| 7,074,338 B2 * | 7/2006 | Mizuno ......................... 210/777 |

FOREIGN PATENT DOCUMENTS

| | | |
|---|---|---|
| JP | 57-194015 A | 11/1982 |
| JP | 2008-126215 A | 6/2008 |
| WO | 2008/109928 A1 | 9/2008 |

* cited by examiner

SYSTEM AND METHOD FOR FILTRATION OF LIQUIDS

CROSS-REFERENCED TO RELATED APPLICATIONS

This application claims priority to European Patent Application No.: 08382063.9, filed on Nov. 11, 2008 the entire contents of which are incorporated by reference herein.

The present invention relates to a system and a method for the filtration of liquids. More particularly it relates to a system and method for the filtration of liquids which may have high solids contents such as beer, wine, water and fruit juices, or biological streams such as from bioreactors containing polyclonal, monoclonal or other desired proteins or enzymes.

BACKGROUND OF THE INVENTION

Wines, beers, fruit juices, water and the protein containing streams from bioreactors and other such liquids need to be filtered to remove impurities such as sugar crystals from wine; or cell debris and other cellular components from the bioreactor stream, or yeast from beer, or grape, other fruit skins and other debris found in raw and even partially purified liquids.

Traditionally, this has been done with loose diatomaceous earth that is added to the liquid and allowed to settle. More advanced technology has become the various lenticular or plate and frame products that are formed of a cellulosic fiber material and various fillers such as diatomaceous earth and various charged polymers. These filter cartridges are normal flow devices, meaning that liquid is directed at them and the liquid flows through them to an outlet while impurities remain trapped in the pad(s). These filter cartridges are arranged in a housing which may contain one or more, generally several of these filter cartridges either in a frame in a plate and frame device or on a central rod that has a series of holes leading to the outlet within the rod in a lenticular pad device. Liquid enters through an inlet generally at the bottom side of the housing and flows around and through the filter(s) to the openings in the rod and out the bottom of the housing through an outlet. The pad filter cartridges become easily clogged with impurities that limit their use in production runs. This often requires the use of two or more identical filter systems that are run sequentially during a filtration operation to ensure adequate capacity.

More recently, users have begun to look at TFF (tangential flow filtration) devices for such filtration applications. The TFF systems utilize the tangential flow across the face of the membrane to constantly sweep the membrane surface clean of materials that could block or plug the membrane leading to a decline in filter efficiency and life time. These devices can be made of flat or hollow fiber ceramic filters or flat, hollow fiber or spiral wound polymeric filters.

While helpful in increasing the life of the filter system, such TFF systems have drawbacks including cost both of the equipment and to run it as well as high hold-up volumes and potential injury/degradation to the liquid due to numerous recirculations through the pump(s) of the system.

TFF filter systems are more capital intensive than pad filters and require extensive specialized equipment including special filters, holders, pumps, retentate lines, etc. that are expensive to purchase. Additionally, the process using this type of filter is different and requires special training and dedicated capital equipment to do so. Moreover, the system uses 10 to 20 times the energy of a pad system for the pumping to create adequate recirculation of the fluid to create and maintain the TFF flow. Likewise, due to the extensive plumbing used in such systems, there is a large holdup volume in the system after filtration is completed. The fluid that has not been filtered and is in the tank, retentate lines, pumps, etc. is discarded after the filtration process. Often this is measured in 10 s of gallons of liquid that is lost and can amount up to 10% (depending of the hold up capacity of the system and the length and number of repeat cycles of filtration) of the starting volume leading to lower overall yield of product. Lastly, many liquids are sensitive to shear and other similar forces imposed upon them in TFF devices and can degrade or injure the product especially wine.

Ceramic filters work but have the additional disadvantage of being susceptible to breakage under a variety of conditions which for the most part can't identified or quantified. An alternative to TFF ceramic filters is now a plastic or polymeric hollow fiber system with low or limited cross flow so as to reduce the number of cycles that the liquid is recirculated. While stating that the quality of the liquid is improved by reducing the recirculation, there are still the drawbacks of expense and large hold up volume. However and more importantly, the low crossflow is accomplished by increasing the surface area of the membranes used, often by at least 2× that of a traditional TFF system, again increasing cost and holdup volume. Additionally, TFF polymeric membranes are relatively weak in strength and are susceptible to rupture if too much pressure or shear is applied to them. Additionally, cleaning such filters is difficult, costly and time consuming making the cost of such filtration much more expensive Besides, TFF is in general very difficult to apply to cold filtration such as may be used with wine, beer, and fruit juice applications as higher viscosity of the liquid due to the lower temperature leads to lower flow rates and therefore bigger systems making them difficult to be economically viable. Another disadvantage in using polymeric TFF filters in cold wine or fruit juice applications which often include the filtration of crystals is that the polymeric membranes are not compatible with the "scratching" effect of the crystals of sugar in cold filtration causing wear on the filters and the production of particles into the fluid.

What is needed is a system for filtration of high solids systems that is simple to set up, run and is less expensive than the TFF systems to purchase and operate and which increase yields with minimal filtration passes through the system to minimize degradation.

SUMMARY OF THE INVENTION

The present invention relates to a system and a process of running the system that allows for the long term filtration of product without loss of filtration capability due to clogging or fouling. The system is a normal flow filtration system having one or more filter cartridges attached to an outlet of one or more housings in the system. The filter cartridge(s) are contained within a bowl and depend preferably vertically from the outlet. Liquid enters the bowl of the housing and contacts the outer surfaces of the one or more cartridges. Impurities are trapped on or in the surface of the filter and the filtered liquid flows through the filter and through the outlet. One or more parameters such as flow rate, transmembrane pressure drop and/or time are measured and when the desired parameter(s) are met, the filtration ceases. A backflushing occurs back through the filter cartridges so as to remove the trapped impurities on or in the filter surface. This backwashed material is directed to an outlet of the bowl that is connected to a drain. The system is then recirculated in a downstream manner to reestablish equilibrium and filtration is the restarted.

Optionally, there may also be a lateral flushing of the outside of the cartridges through one or more ports formed in the sidewall of the bowl adjacent the outer surface(s) of the one or more cartridges. This may be done in lieu of but preferably in addition to the backflushing step and may occur either before or after the backflushing step but before the recirculation step. Unfiltered liquid is directed against the outer surfaces of the cartridge(s) to dislodge any trapped impurities and to remove any impurities that may have settled in the bowl. The port(s) may be tangential to the vertical surface of the filter cartridge(s); preferably the port(s) are perpendicular to the outer vertical surface(s) of the cartridge(s).

Additionally, steps for the washing of the filter(s) with water and cleaning of the system can be conducted using the existing system design.

Moreover, a system with two or more housings may be used so that at least one is on line while the other(s) is being regenerated or cleaned.

The system can be used in a process that may be manually operated (by a system operator manually operating the valves, pumps, etc) or automatically (through a series of PIDs, a CPU, computer, computer network or other system that controls hardware and/or software).

The system also includes a process for the filtration of a liquid through one or more filter cartridge(s), backflushing of filter cartridge(s), optionally lateral flushing of the exterior of the cartridge(s) through a port in the housing sidewall and a recirculation step. Optionally, water washing or CIP may also be accomplished in the present system.

IN THE DRAWINGS

DETAILED DESCRIPTION

By "port(s)" it is meant that one or more ports exist or can be used. By "filter cartridge(s)" it is meant that one or more cartridges can exist or be used.

Figure 1:
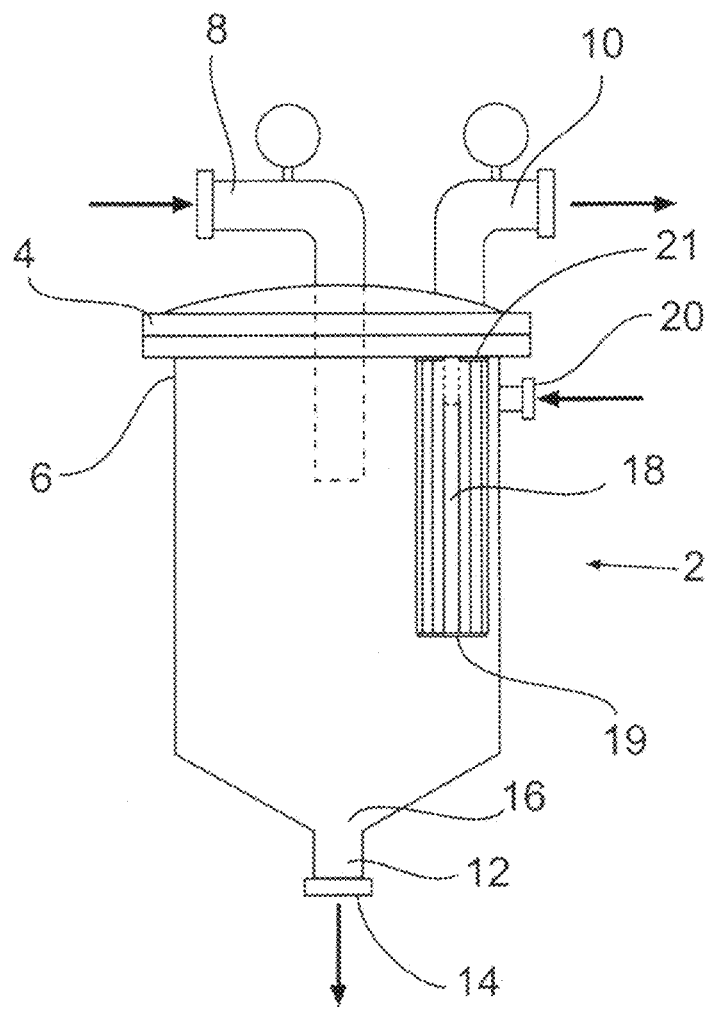
FIG. 1 shows a housing useful in a system according to the present invention in cross sectional view.

FIG. 1 shows a filter housing 2 according to the present invention. It is formed of two major components, a head 4 and a bowl 6. The head contains an inlet 8 and an outlet 10. The bowl 6 has a drain 12 formed at or near its lowermost point 14.

The bowl 6 may have a frustoconical bottom 16 as shown or it may have a rounded, a tapered or even a flat bottom if desired. Preferably, it is a frustoconical, rounded or tapered shape. By having such a shape adjacent and/or at its lowermost point 14, the drain 12 can work more efficiently to remove debris and impurities from the housing 2 as will be described further in. Often these shapes allow for the concentration of the impurities so that minimal amounts of product are lost from the system when the impurities are removed from the housing.

As shown the one or more filter cartridges 18 are attached to the outlet 10 of the housing 2. The cartridge(s) 18 are arranged so that the cartridge(s) 18 hang vertically from the outlet 10 of the head 4 into the bowl 6. These cartridge(s) 18 are well known in design and have a closed end 19 which in this embodiment is farthest from the outlet 10 and an open outlet end 21 which is attached to the outlet 10 of the housing 2. The cartridge(s) 18 contain one or more layers of filter material which may be pleated porous plastic membrane, spun or wound fibers such as of plastic, glass and the like and/or non woven materials. If desired various support and protective layers such as an outer porous protective cage, an inner porous core and one or more layers of filter support materials such as porous non-woven scrims and the like.

Typical plastics for the filter material include but are not limited to polyolefins such as polyethylene and polypropylene, polyvinylidene fluoride (PVDF), polyvinyl alcohols, polyvinyl chlorides, polysulfones, polyarylsulfones, polyethersulfones, polyphenylsulfones, PTFE resins, PFA resins, polyesters, nylons, polyamides, polyimides, and celluloses and modified cellulosic materials such as cellulose acetate.

The pore size of the filter will vary depending upon the filter type chosen, the impurities to be filtered and the like. They may range from about 0.1 micron average pore size to 10 microns pore size. Typically, a 2.0, 1.0, 0.65, 0.45 or 0.22 micron pore size are used for membrane type filters depending on the application, the impurities to be removed, the amount of impurities present and the like. Preferably filter having a pore size between about 0.65 and 2.0 microns is used. Non-wovens and depth filters such as wound filters and the like are not often rated by pore size but the extent that they are the same pore sizes as for membranes can be used.

Figure 2:
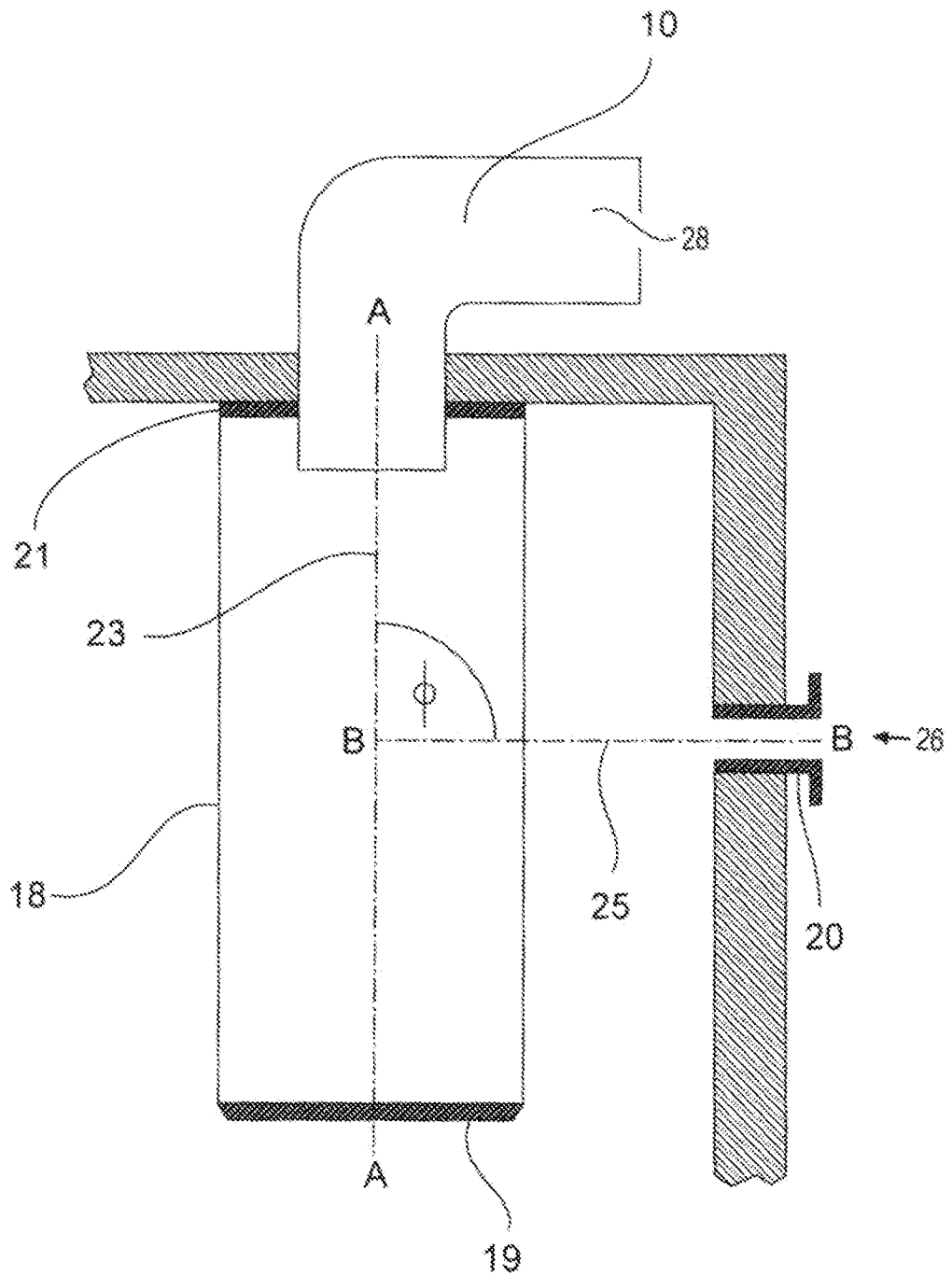
FIG. 2 shows a close up of a portion of the housing of FIG. 1 according to the present invention in cross sectional view.

The housing may also contain one or more additional port(s) 20 in the side of the housing 2 adjacent the filters 18 that is used in the cleaning process described further below. The port(s) are tangential to the substantially vertical surface of the filter cartridge(s) and may be at an angle φ formed between the centerline (A-A) 23 of the cartridge(s) and the centerline (B-B) 25 of the port 20 as shown in FIG. 2. Preferably the angle φ is from about 15° to about 165°, more preferably from about 30° to about 150° or 45° to about 135° and most preferably it is substantially perpendicular or about 90°. The port(s) 20 are in fluid communication with the source 26 of unfiltered fluid by a port conduit 21 which branches off of the conduit 28. This port conduit 21 is generally closed by a port valve (not shown) and only opened for a lateral flushing step explained below at FIG. 6.

Figure 3:
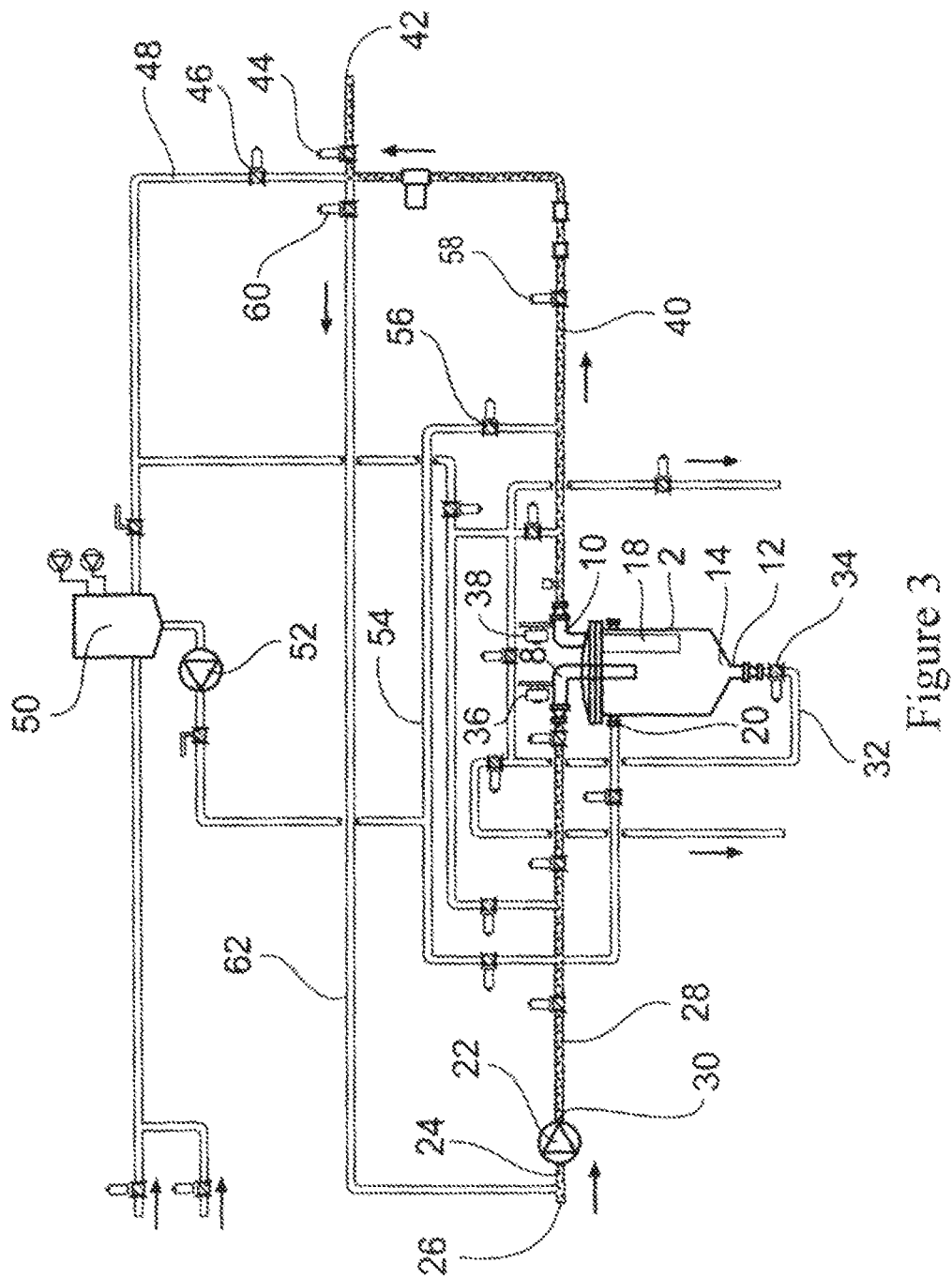
FIG. 3 shows the flow path for filtration in a system according to the present invention in cross sectional view.

FIG. 3 shows such a housing 2 and the system into which it is incorporated. A pump 22 is connected at its inlet 24 to a source of liquid 26 to be filtered. A conduit 28 connects the outlet 30 of the pump 22 to the inlet 8 of the housing 2. Liquid enters the bowl 6 and is drawn through the filter 18 and through the outlet 10. Drain 12 is connected to a waste line 32 and closed off from the waste line by a valve (not shown).

Optionally a first sensor 36 is located at the inlet 8 and a second sensor 38 is located at the outlet 10. The two sensors 36, 38 in combination can measure the transmembrane pressure in the one or more filter cartridges 18 or the flow rate of the system as will be described below. The sensors may be pressure sensors when determining transmembrane pressure differential or flow meters when determining flow rates. Any pressure sensor may be used, be it dial or analog or digital read out. The pressure sensor may be "dumb" requiring the operator to monitor the gauge or read out to determine if a desired parameter has been met (as will be explained below) or it may be intelligent and provide a signal to the system when the parameter is reached. Likewise any flow sensor may be used, such as a paddle wheel flow sensor that determines flow by counting the revolutions of the wheel or propeller in the sensor. It may be a dial or analog or digital read out. The sensor may be "dumb" requiring the operator to monitor the gauge or read out to determine if the desired parameter (flow rate) has been met (as will be explained below) or it may be intelligent and provide a signal to the system when the parameter is reached.

Filtrate (liquid that has passed through the filter layer(s) of the cartridge(s) 18) exits the housing 2 through outlet 10 to conduit 40 and through valve 44 to a next step or storage tank 42. Also shown is valve 46 in conduit 48 that selectively allows filtrate to flow to backflushing tank 50 for storage and use as described below. Valve 46 is normally closed off allowing filtrate to flow through valve 44.

In operation, liquid to be clarified or filtered is supplied from the source 26 such as a vat, tank or bin to the pump inlet 24. The pump 22 moves the liquid through conduit 28 to the inlet 8 of the housing 2. The liquid enters the bowl 6 outside of the filter cartridge(s) 18 and passes through the filter layer(s) of the cartridge(s) 18 to the outlet 10 of the housing 2. Then through conduit 40 and valve 44 to a downstream component such as a next step or storage tank 42.

Impurities either are kept in the bowl 6 or become trapped in the filter layer(s) of the cartridge(s) 18. After a while the filtration rate will decline and/or the transmembrane pressure differential will increase above the accepted parameter and the filter cartridge(s) 18 will need to be backflushed. When this backflushing is to occur can be determined by a variety of parameters, including but limited to time, transmembrane pressure and flow rates.

As to the use of a time parameter, one can simply apply a timer to the controls for the pump 22 and/or valves into and out of the housing 2 if any. At a predetermined schedule, the pump 22 is shut off and filtrate is pulled from tank 50 through pump 52 and conduit 54 and valve 56 which is opened and back through the filter(s) 18 to dislodge any impurities that are adjacent or embedded in the filter(s) 18. The impurities then settle out toward the lowermost portion 14 of the bowl 6. Valve 58 is also closed at this time. The backflushed liquid is then preferably sent to drain so that all clogging material is removed from the system. This step and its flow path are shown in FIG. 4.

The period of backflushing does not need to be long. It merely needs to provide a pulse of backflow and pressure sufficient to clean the filter cartridge(s) 18 to a degree sufficient to allow further filtration to proceed. In a preferred embodiment, the period of time for backflushing is from about 2 to 20 seconds, more preferably from about 5 to 10 seconds.

The pressure of the backflushing can be about the same as the filtration pressure differential (generally around 1 bar over the actual downstream pressure). If desired additional pressure may be applied to the backflushing operation.

Figure 4:
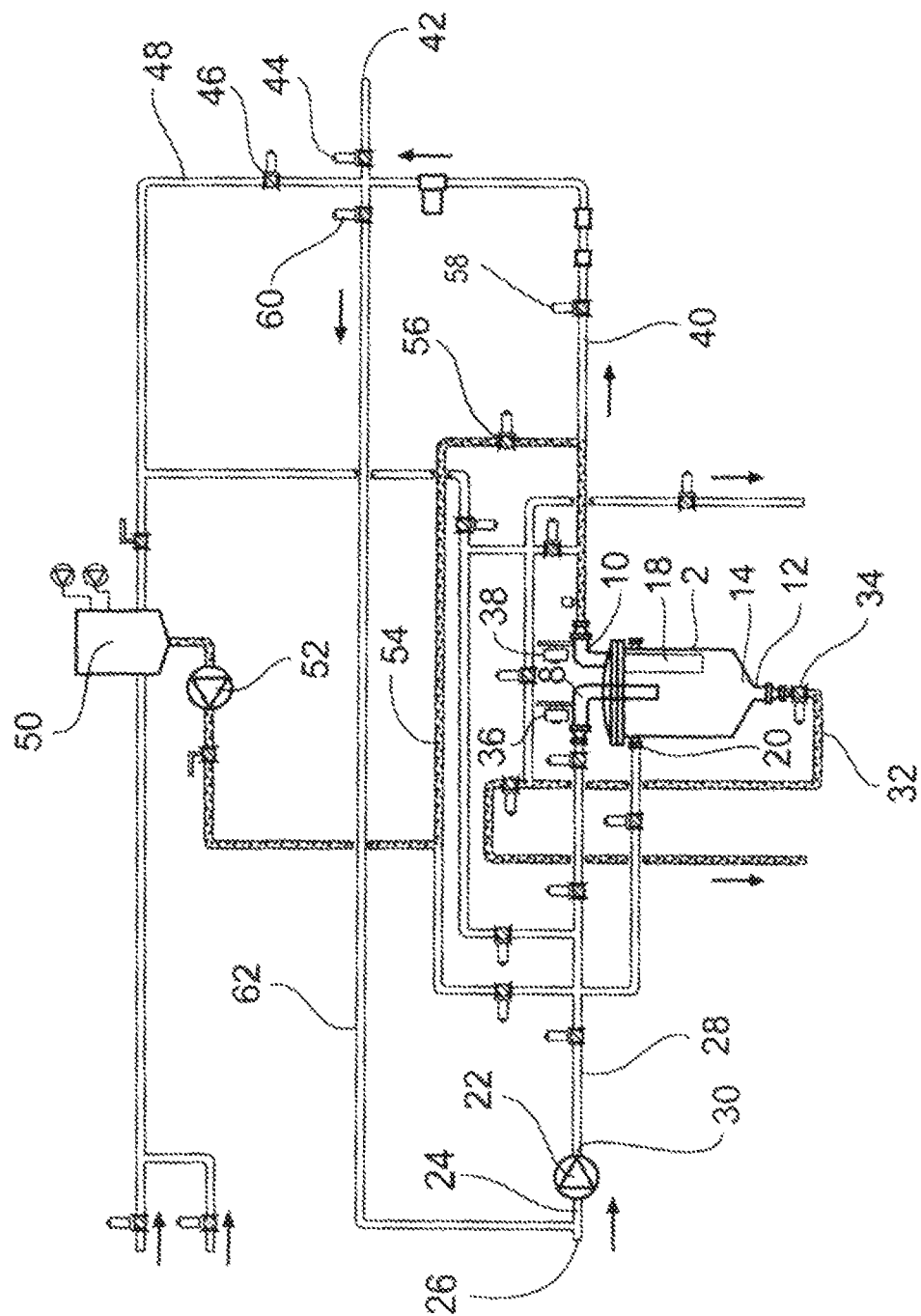
FIG. 4 shows the flow path for backflushing in a system according to the present invention in cross sectional view.

Then the pump 22 is turned back on and the remaining fluid from the backflushing step above in FIG. 4 is moved through conduit 28 into the housing 2 and out through conduit 40 as in the filtration step of FIG. 3. Valves 44 and 46 are closed and valve 60 is opened to allow the liquid to recirculate back to the inlet 24 of the pump 22. Optionally and preferably, new unfiltered liquid is also drawn into the system at the same time from source 26. This recirculation need only occur for a short period of time so that the liquid is reequilibrated and/or any filtration cake that is needed for filtration to occur is formed.

Valve 60 is then closed and valve 44 is reopened and filtration resumes. Additionally, at some point during the filtration process, valve 46 is opened and valve 44 is closed to allow tank 50 to refill for the next flushing cycle.

The period of recirculation does not need to be long. It merely needs to provide a filtration cake if needed for filtration and/or equalize all the liquid within the system before filtration can begin again. In a preferred embodiment, the period of time for backflushing is from about 20 seconds to 60 seconds, more preferably from about 20 to 40 seconds and most preferably about 30 seconds.

The pressure of the recirculation should be about the same as the filtration pressure differential (generally around 1 bar over the actual downstream pressure). If desired additional pressure may be applied if desired (for example to generate a filtration cake).

Preferably, in one embodiment of the present invention where time is used as the parameter, one sets a schedule based upon the load of impurities in the stream, the filter cartridge(s) 18 selected and the volume of material to be filtered. Typically, it has been found that a schedule set between every 10 to every 20 minutes is useful for most applications. For most the preferred time parameter is every 10 minutes. The same process of valve openings/closing and pump movements are used as described above to create the backflushing and recirculation steps.

The period of backflushing and the pressure used is the same as described above.

As to the use of a transmembrane pressure parameter, one can simply select a transmembrane pressure upper limit that corresponds to a certain level of clogging of the filters. One can use pressure sensors as sensors 36 and 38 to measure the upstream and downstream pressures of the filter layer(s) and determine when the transmembrane pressure (the difference between the upstream or inlet pressure and the downstream or the outlet pressure) is too great. When that parameter value is met or exceeded the same backflushing and recirculation steps occur.

Preferably, in one embodiment of the present invention where transmembrane pressure is used as the parameter, one sets a limit of from about 0.2 bar (20 KPa) to about 5.0 bar (500 KPa) depending upon the impurities in the stream, the filter(s) 18 selected and the volume of material to be filtered. Typically it is between about 0.2 bar (20 KPa) and 1 bar (100 KPa) difference (but again, the pressure differential chosen is dependant of the quality of impurities, and therefore of the fluid to be filtered). For most applications, the preferred transmembrane pressure differential parameter is 0.2) bar (20 KPa).

As to the use of the flow rate parameter, one can simply select a sensor to measure flow rate such as flowmeter preferably on the downstream or outlet side of the system. A reduced flow rate that equates to a certain level of clogging of the filter(s) is determined and when that reduced flow rate is reached the backflushing operation described above in relation to the transmembrane pressure differential or time system above is utilized.

Preferably, in one embodiment of the present invention where flow rate is used as the parameter, one sets a limit of from about 50% to about 80% of the initial flow rate depending upon the impurities in the stream, the filter cartridge(s) 18 selected and the volume of material to be filtered. Typically it has been found that a reduction in flow rate of between 20 and 40% from the initial flow rate is useful for most applications.

Figure 6:
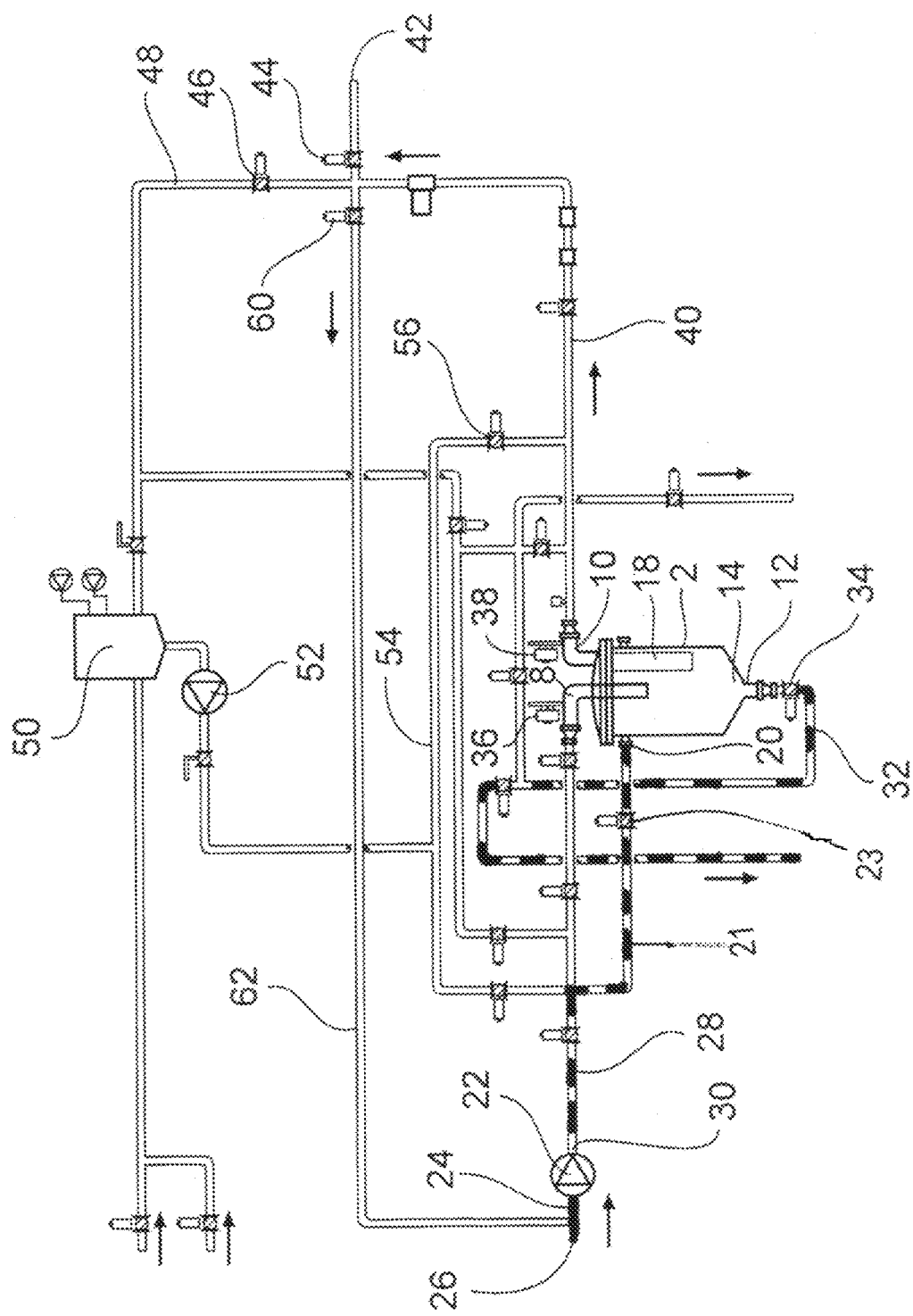
FIG. 6 shows the flow path lateral flushing in a system according to the present invention in cross sectional view.

At some point in the process or as an alternative to the backflushing step (although the backflushing step of FIG. 4 is preferred and this optional step is an additive step that may be used as desired either before or after the backflushing step), one may use a lateral flushing step by introducing liquid through port(s) 20 in the side of the housing 2 rather than through the inlet 8. Impurities are pushed off and out of the filter cartridge(s) 18 and then are discarded through the drain 12 in a manner described above. This optional step is shown in FIG. 6. Fluid from source 26 flows into conduit 21 through one or more ports 20 and against the outer surface of the cartridges 18. From there, the fluid and any impurities removed from the cartridges are flowed out of the system to the drain 12.

The period of lateral flushing does not need to be long. It merely needs to provide a pulse of liquid at a pressure sufficient to clean the filter cartridge(s) 18 to a degree sufficient to allow further filtration to proceed. In a preferred embodiment, the period of time for lateral flushing is from about 2 to 20 seconds, more preferably from about 5 to 10 seconds.

Figure 7:
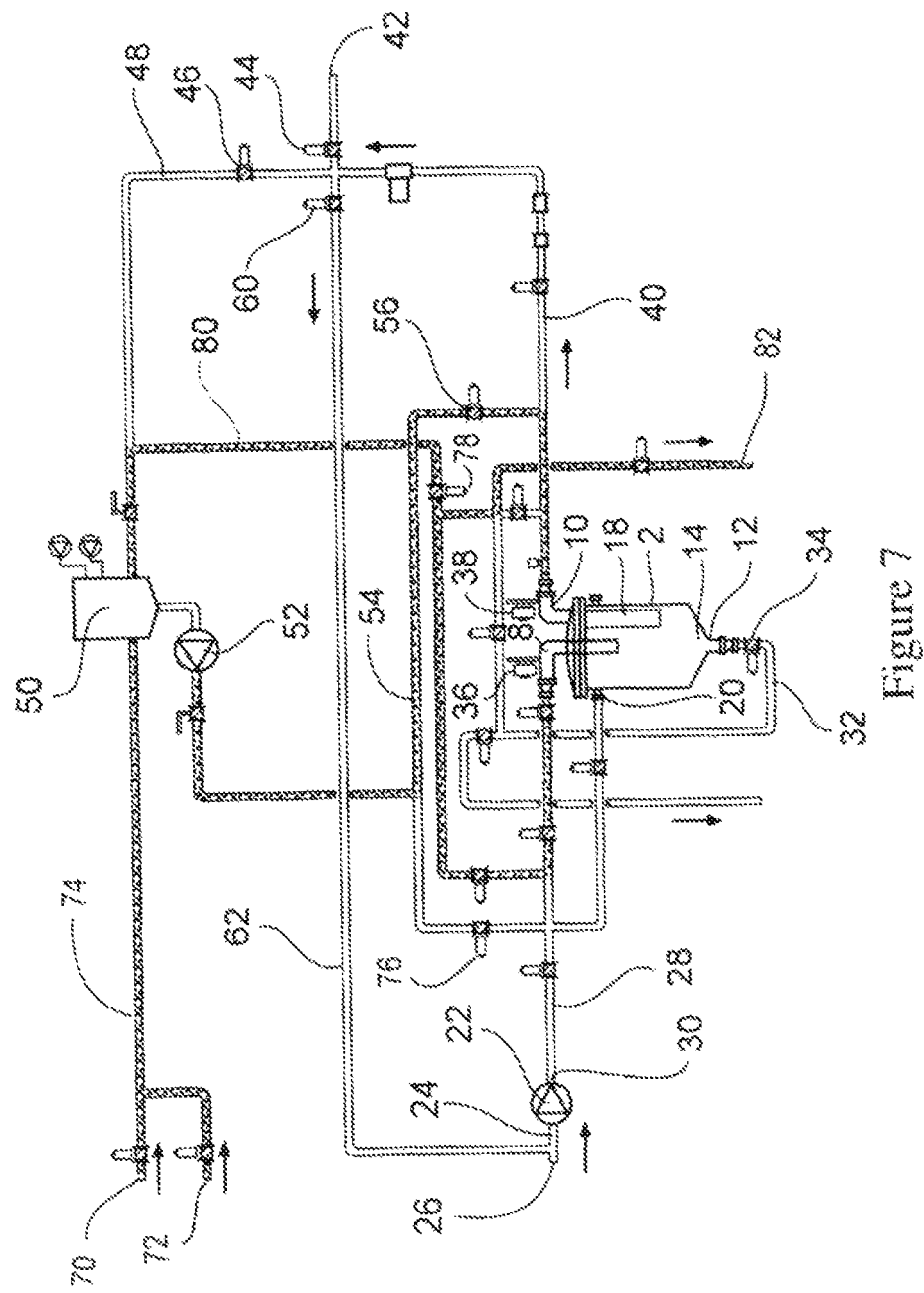
FIG. 7 shows the flow path for water washing or cleaning in place (CIP) in the reverse direction in a system according to the present invention in cross sectional view.

FIG. 7 shows a step for cleaning the system after use or flushing the system before use to remove any potential contaminants that may have entered the system during assembly. Water be it cold 70 or hot 72 or optionally steam instead of one or the other waters 70, 72 is supplied by conduit 74 through tank 50 pump 52 and conduit 54 to conduit 40 and outlet 10 of the housing 2. Various valves such as 76 are closed to cause the water or steam to flow through the housing 2 and it can be returned to the tank 50 via conduit 80 for recirculation. After the desired time, the water or and/or steam is shut off and valve 78 is shut to close off the water return conduit 80 and the water/steam is drained through conduit 82 to a water/steam drain. Optionally, the conduits used in this step may also be subjected to pressurized air to cause the water/steam to drain out more efficiently as is well known in the art.

Figure 8:
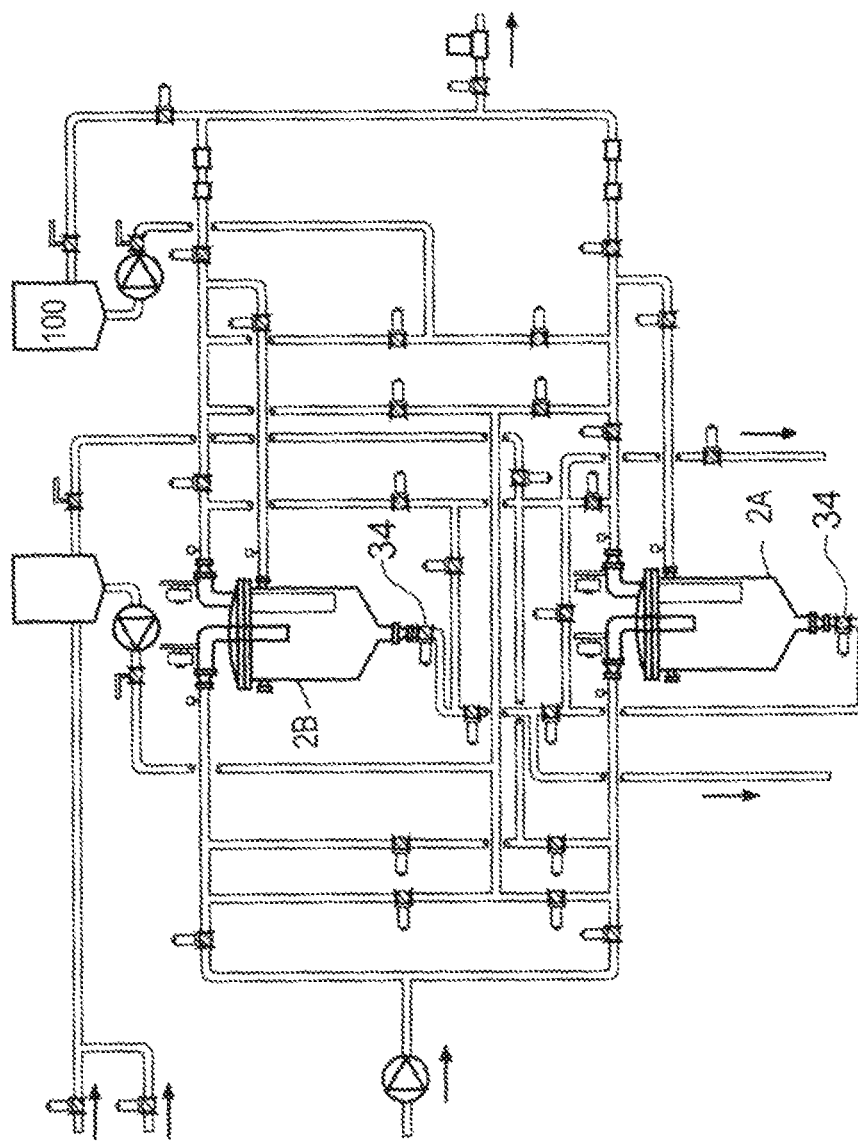
FIG. 8 shows a system of the present invention using two such housings either in parallel or alternately.

FIG. 8 shows a system having more than one or two or more housings 2A and B. The operation of the system is similar to that explained in FIGS. 3-7 and would be obvious to one of ordinary skill in the art the only addition being a dedicated water/steam tank 100. This allows one to use one housing 2A while the other is being regenerated through the process described in FIGS. 4 and 5 and optionally 6 and/or 7. Alternatively, the two or more housing can be run in parallel at the same time if desired.

Preferably the temperature of the process in any embodiment is kept at a range between about −6° C. and about 20° C. (minus temperatures may be used for liquids that contain alcohol or salts that depress their freezing point or are formed of materials that have freezing points below 0° C.). For many applications, such as wine filtration, fruit juice filtration, biological filtration, the process takes place in chilled rooms and in chilled systems with temperatures ranging between about 4° C. and about 10° C. In the case of filtration of wine for removing bitartrate crystals (cold stabilization of wines), the temperature of filtration is as a rule of thumb minus half of the alcohol content (otherwise the crystals would redissolve). This means for alcohol of 11% one would conduct the filtration at temperatures of about −4° C. or −5° C.

The liquid can be prechilled before entering the system. The system may be insulated if desired but generally it is not needed as the time spent in the system is relatively low. Alternatively, the system may be run in a cooled or "cold" room to minimize any shift in temperature within the liquid while being processed. In some extraordinary situations, the system can be affirmatively cooled by cold water circulation systems or chilling blankets as are well known in the art.

The filter is a normal flow polymeric filter such as a Polygard® CE filter available from Millipore Corporation of Billerica, Mass. which contain a glass fiber/diatomaceous earth/polypropylene fiber blend of materials. However any normal flow filter that can withstand backflushing pressures on repeated cycles can be used in the present invention.

The system can be used in a process that may be manually operated (by a system operator manually operating the valves, pumps, etc) or automatically (through a series of PIDs, a CPU, computer, computer network or other system that controls hardware and/or software).

EXAMPLE

A system according to that of FIG. 8 which had a twin two 3 round 30" Polygard® CE filter cartridges (2-micron pore size) available from Millipore Corporation of Billerica, cartridges in parallel was used and incorporated a housing according to that of FIG. 1 such that the outlets of the cartridges were attached to the outlet of each housing via the housing round plate as is well known in the art so that liquid leaving the housing outlets first passed through the filter cartridges.

500 liters of unfiltered white wine with an alcohol content 12% from a stainless steel tank was supplied to the inlet of the pump at a temperature of −2° C. at an upstream pressure of 0.2 bar (20 KPa) as read by the upstream pressure monitor on the inlet to the housing. Filtrate passed through the outlet of the housing at a pressure of 0.2 bar (20 KPa).

Time was the parameter measured and this was done by a stop watch.

After 10 minutes, the pump was shut off manually and the backwashing step as taught in FIG. 4 was run for 6 seconds at a pressure of 0.7 bar (70 KPa) as read on the pressure sensor of the outlet.

Figure 5:
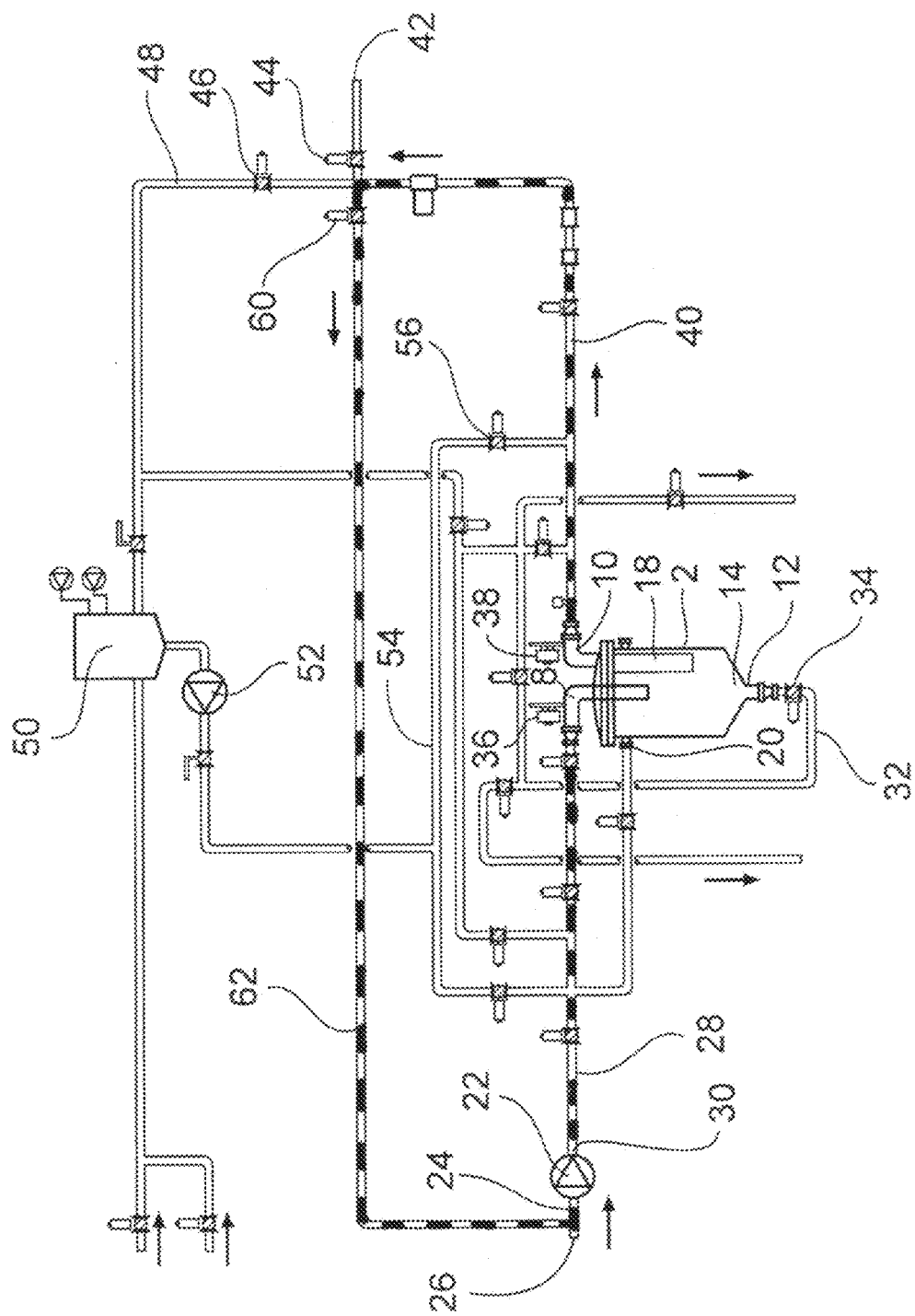
FIG. 5 shows the flow path for recirculation in a system according to the present invention in cross sectional view.

The recirculation step as described in relation to FIG. 5 was run at 0.7 bar (70 KPa) measured at the upstream sensor on the inlet to the housing for 28 seconds to reequilibrate the systems and create the desired filter cake on the filter surface.

The above steps were run in sequence 6 times.

After 5 filtration and backflushing steps were completed a lateral washing step through the side ports) of the housing was conducted for 6 seconds at a pressure of about 0.7 bar (70 KPa), followed by the recirculation step.

A control system formed of a standard TFF hollow fiber system (Ronfil hollow fiber system, sold by Domnick Hunter Ibérica) was run using the same wine and both systems had flow rates, turbidity of wine and clogging index (filterability index) measured.

The Clogging Index is a filterability index is widely used in European wineries to gauge the filterability of a wine. Clogging index is the difference in time between how long it takes to filter from 200 ml and 400 ml as compared to the time it takes to filter the first 200 ml on a continuous experiment at a given pressure and membrane.

The method for calculating it is the following:

T0=initial time of 0 seconds.

T2=time in seconds to filter the first 200 ml (from 0 ml to 200 ml) of wine through a 0.65 membrane at 2 Bar inlet pressure.

T4=time to filter the second 200 ml (from 200 ml to 400 ml) of wine through the same filter and at the same pressure.

$$CI=(T4-T2)-(T2-T0)=T4-2*(T2)$$

Units are reported in seconds, but it is normally treated as a index with no units assigned.

The wine filtered according to the control and the present invention had the following characteristics as set forth in Table 1:

| Time (min) | Control Flow Rate (l/h) | Control Turbidity (NTU) | Control Clogging Index | Invention Flow Rate (l/h) | Invention Turbidiy (NTU) | Invention Clogging Index |
|---|---|---|---|---|---|---|
| 10 | 1200 | <1 | 10 | 600 | <1 | 11 |
| 20 | 900 | <1 | 12 | 600 | <1 | 14 |
| 30 | 650 | <1 | 8 | 600 | <1 | 12 |
| 40 | 450 | <1 | 11 | 600 | <1 | 14 |
| 50 | 150 | <1 | 10 | 600 | <1 | 13 |

The holdup and lost volume for backflushing and lateral backflushing for the present invention was 5 liters or 1% of the starting volume and the filtration occurred in 50 minutes.

The holdup and lost volume for the control was 35 liters or 7% of the starting volume and the filtration required 66 minutes to complete.

As can be seen for the example the present invention significantly reduced the volume lost to hold up volume of the system and completed the filtration quicker and maintained a high, consistent flow rate through out the entire test.

While the above example was with wine, this system can be used equally well with other liquids which need clarification such as beer, water, fruit juices, energy drinks that contain impurities such as fruit pulp or skin, solid impurities, clarification aids such as egg albumin or diatomaceous earth and the like. Likewise it is suitable for use with biological streams such as the output from a bioreactor which contains a protein of desire, such as a monoclonal antibody, along with other impurities including but not limited to clarification aids such as diatomaceous earth or flocculants, cell debris, host proteins and other undesirable cell elements and the like.

The invention claimed is:

1. A method of filtration comprising
   a. providing a source of fluid to be filtered, a source conduit connecting the source to an inlet of a filtration device,
      i. the filtration device comprising a housing containing one or more filter cartridges,
      ii. the one or more filter cartridges being normal flow filtration filter cartridges, the one or more filter cartridges being in fluid communication with a housing outlet which is in fluid communication with an outlet conduit connecting the outlet to a downstream component and to a backflushing loop,
      iii. the downstream component being selectively closable by a normally open downstream component valve and the backflushing loop being selectively openable by a normally closed backflushing loop valve,
      iv. the backflushing loop for the filtrate comprising a backflushing conduit connecting the outlet via the backflushing loop valve to a filtrate tank, the tank having a tank outlet connected to a tank conduit back to the housing outlet wherein the tank conduit is normally closed off from the housing outlet by a tank conduit valve,
      v. the inlet and the outlet of the housing being located at an uppermost portion of the housing and a drain being located at a lowermost portion of the housing,
      vi. one or more ports formed in the side of the housing adjacent the one or more filter cartridges, the one or more ports being connected to a side of the housing adjacent the one or more filter cartridges, the port(s) being connected to the source conduit by a port conduit controlled by a port valve;
   b. supplying the fluid to be filtered through the source conduit and into the inlet of the housing;
   c. passing the fluid through the one or more filter cartridges and into the outlet and into the outlet conduit and past the downstream component valve to the downstream component;
   d. selecting a parameter selected from the group consisting of length of time of filtration, transmembrane pressure differential of the one or more filter cartridges measured at the inlet and the outlet and flow rate reduction of the fluid measured at the inlet and the outlet;
   e. monitoring the selected parameter to determine when a preset value of the parameter is reached or exceeded;
   f. upon reaching or exceeding the preset value of the selected parameter, closing the downstream component valve, opening the drain and opening the tank conduit valve to direct filtrate back through the outlet and the one or more filter cartridges into the housing and out the drain for a period of time sufficient to backflush the filter cartridges;
   g. dosing the tank conduit valve and drain and opening a reequilibration valve and reequilibration conduit between the downstream component valve and the outlet conduit and the source conduit for a desired period of time to recirculate the fluid, and
   h. closing reequilibration valve and reequilibration conduit and reopening the downstream component valve and reinitiating the supply of the fluid from the inlet to the one or more filter cartridges to reinitiate the filtration process.

2. The method of claim 1 further comprising step (i) wherein steps (b)-(h) are repeated at least one time.

3. The method of claim 1 further comprising step (i) wherein steps (b)-(h) are repeated N times wherein N is an integer from 1 to 100.

4. The method of claim 1 wherein the housing provided by step (a) further comprises a first sensor at the inlet of the housing and a second sensor at the outlet of the housing for monitoring the parameter of transmembrane pressure differential or flow rate reduction selected in step (d).

5. The method of claim 1 wherein the housing provided by step (a) further comprises a first pressure monitor at the inlet of the housing and a second pressure monitor at the outlet of the housing for monitoring the transmembrane pressure differential parameter selected in step (d).

6. The method of claim 1 wherein the housing provided by step (a) further comprises a first flow rate sensor at the inlet of the housing and a second flow rate sensor at the outlet of the housing for monitoring the flow rate reduction parameter selected in step (d).

7. The method of claim 1 wherein the housing provided by step (a) further comprises first and second pressure monitors and the first and second monitors are selected from the group consisting of analog and digital pressure gauges.

8. The method of claim 1 wherein the selected parameter is time and is measured by a timer.

9. The method of claim 1 wherein the fluid is supplied cold.

10. The method of claim 1 wherein the fluid is supplied at a temperature of from between −4° C. to 20° C.

11. The method of claim 1 wherein the filtration step (c) is from about 10 to 20 minutes.

12. The method of claim 1 wherein the backflushing step (f) is from about 2-20 seconds.

13. The method of claim 1 wherein the recirculation step (g) is from about 20 to 60 seconds in length.

14. The method of claim 1 further comprising a lateral flushing step (j) either before or after the backflushing step (f) and the step (j) is from about 2 seconds to 20 seconds.

15. The method of claim 1 wherein the one or more port(s) are tangential to an outer vertical surface of the filter cartridge(s).

16. The method of claim 1 wherein the one or more port(s) are tangential to an outer vertical surface of the filter cartridge(s) at an angle φ formed between a vertical centerline of the cartridge(s) and a centerline of the port(s).

17. The method of claim 1 wherein the one or more port(s) are tangential to an outer vertical surface of the filter cartridge(s) at an angle φ formed between a vertical centerline of the cartridge(s) and a centerline of the port(s) and the angle φ is from about 150 to about 165°.

18. The method of claim 1 wherein the one or more port(s) are tangential to an outer vertical surface of the filter cartridge(s) at an angle φ formed between a vertical centerline of the cartridge(s) and a centerline of the port(s) and the angle φ is from about 30° to about 150°.

19. The method of claim 1 wherein the one or more port(s) are tangential to an outer vertical surface of the filter cartridge(s) at an angle φ formed between a vertical centerline of the cartridge(s) and a centerline of the port(s) and the angle φ is from about 450 to about 135°.

20. The method of claim 1 wherein the one or more port(s) are tangential to an outer vertical surface of the filter cartridge(s) at an angle φ formed between a vertical centerline of the cartridge(s) and a centerline of the port(s) and the angle φ is about 90°.

21. A method of filtration comprising
   a. providing a source of fluid to be filtered, a source conduit connecting the source to an inlet of a filtration device,
      i. the filtration device comprising a housing containing one or more filter cartridges,
      ii. the one or more filter cartridges being normal flow filtration filter cartridges, the one or more filter cartridges being in fluid communication with a housing outlet which is in fluid communication with an outlet conduit connecting the outlet to a downstream component and to a backflushing loop,
      iii. the downstream component being selectively closable by a normally open downstream component valve and the backflushing loop being selectively openable by a normally closed backflushing loop valve,
      iv. the backflushing loop for the filtrate comprising a backflushing conduit connecting the outlet via the backflushing loop valve to a filtrate tank, the tank having a tank outlet connected to a tank conduit back to the housing outlet wherein the tank conduit is normally closed off from the housing outlet by a tank conduit valve,
      v. the inlet and the outlet of the housing being located at an uppermost portion of the housing and a drain being located at a lowermost portion of the housing,
      vi. one or more ports formed in the side of the housing adjacent the one or more filter cartridges, the one or more ports being connected to a side of the housing adjacent the one or more filter cartridges, the port(s) being connected to the source conduit by a port conduit controlled by a port valve;
   b. supplying the fluid to be filtered through the source conduit and into the inlet of the housing;
   c. passing the fluid through the one or more filter cartridges and into the outlet and into the outlet conduit and past the downstream component valve to the downstream component;
   d. selecting a parameter selected from the group consisting of length of time of filtration, transmembrane pressure differential of the one or more filter cartridges measured at the inlet and the outlet and flow rate reduction of the fluid measured at the inlet and the outlet;
   e. monitoring the selected parameter to determine when a preset value of the parameter is reached or exceeded;
   f. conducting a lateral flushing step when the preset value is reached or exceeded by closing the downstream component valve, opening the drain and opening the port valve to direct source fluid laterally through one or more ports in the housing against the one or more filter cartridges into the housing and out the drain for a period of time sufficient to clean the filter cartridges;
   g. closing the port valve and drain and opening the downstream component valve and reinitiating the supply of the fluid from the inlet to the one or more filter cartridges to reinitiate the filtration process.

22. The method of claim 21 wherein the step (f) is from about 2 seconds to 20 seconds.

* * * * *

UNITED STATES PATENT AND TRADEMARK OFFICE
CERTIFICATE OF CORRECTION

PATENT NO. : 8,591,745 B2 Page 1 of 1
APPLICATION NO. : 12/589499
DATED : November 26, 2013
INVENTOR(S) : Filipe Merino et al.

It is certified that error appears in the above-identified patent and that said Letters Patent is hereby corrected as shown below:

In the claims:

In column 11, line 26, in claim 17 delete "150" and insert -- 15° --, therefor.

In column 11, line 36, in claim 19 delete "450" and insert -- 45° --, therefor.

Signed and Sealed this
Eighteenth Day of March, 2014

Michelle K. Lee
*Deputy Director of the United States Patent and Trademark Office*